US00RE41737E

(19) United States
(12) Reissued Patent
Leem

(10) Patent Number: US RE41,737 E
(45) Date of Reissued Patent: Sep. 21, 2010

(54) METHOD FOR SEARCHING CELLS IN MOBILE COMMUNICATION SYSTEM

(75) Inventor: Jun-Bae Leem, Seoul (KR)

(73) Assignee: Samsung Electronics Co., Ltd. (KR)

(21) Appl. No.: 10/944,541

(22) Filed: Sep. 17, 2004

Related U.S. Patent Documents

Reissue of:
(64) Patent No.: 6,452,912
Issued: Sep. 17, 2002
Appl. No.: 09/349,298
Filed: Jul. 7, 1999

(30) Foreign Application Priority Data

Jul. 7, 1998 (KR) ..... 98-27245

(51) Int. Cl.
*H04B 7/216* (2006.01)

(52) U.S. Cl. ..... 370/335; 455/456.1; 455/404.2; 455/69; 370/333; 370/342

(58) Field of Classification Search ..... 370/333, 370/342, 335, 331, 332; 455/69, 522, 456.1, 455/574, 127.5, 436, 439, 442, 513, 115.3, 455/134, 443
See application file for complete search history.

(56) References Cited

U.S. PATENT DOCUMENTS 5,724,384 A * 3/1998 Kim et al. ..... 375/149
5,790,589 A * 8/1998 Hutchison et al. ..... 375/149
5,950,131 A * 9/1999 Vilmur ..... 370/332
5,970,084 A * 10/1999 Honda ..... 370/342
5,987,012 A * 11/1999 Bruckert et al. ..... 370/331
6,263,010 B1 * 7/2001 Naruse et al. ..... 375/130
6,535,752 B1 * 3/2003 Dent ..... 455/574

FOREIGN PATENT DOCUMENTS

| | | |
|---|---|---|
| EP | 0 566 893 | 10/1993 |
| EP | 0 837 617 | 4/1998 |
| GB | 2 330 402 | 4/1999 |
| RU | 2 107 992 | 3/1998 |

* cited by examiner

*Primary Examiner*—Tu X Nguyen
(74) *Attorney, Agent, or Firm*—The Farrell Law Firm, LLP

(57) ABSTRACT

A rapid cell search method is disclosed for a mobile station in a mobile communication system. Upon detection of a power-off request, the mobile station stores in a memory PN information of adjacent cells in association with receiving power levels of the adjacent cells. Upon power on, it is determined whether the mobile station is presently located in a same cell group where it was located at a power-off time. When the mobile station is located in the same cell group, it sequentially reads the PN information from the memory in order of receiving power level to search the adjacent cells. Further, the mobile station searches a cell registered at the power-off time prior to searching the adjacent cells.

6 Claims, 4 Drawing Sheets

METHOD FOR SEARCHING CELLS IN MOBILE COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a mobile station radio communication system and, more particularly, to a method for searching cells using PN codes upon power on.

2. Description of the Related Art

In general, a mobile communication system employs a cellular configuration to support many users with limited radio frequency (RF) resources. That is, the service area for radio communication is divided into several small zones or cells, and the RF resources are allocated per cell. FIG. 1 shows an ideal cellular configuration applied to a typical mobile communication system. In a mobile communication system employing such a cellular configuration, it is necessary to detect a location of a mobile station (or cellular terminal) in order to setup a call for which the mobile station is considered to be the call destination. The process of detecting the location of the mobile station is referred to as "location registration". The location registration can be generally divided into power-on location registration, power-off location registration, time-based location registration, distance-based location registration, parameter changed location registration, command-based location registration, implicit location registration and cell channel location registration.

Power-off location registration is performed, when a user turns off a power switch of the mobile station. However, when this occurs, the power supply to the mobile station is not actually cut off until the power-off location registration is completed. Further, the mobile station does not perform the power-off location registration unless a present location is registered. In a power-off state, if the mobile station is beyond an effective distance at its presently registered location, power-off location registration may not be performed correctly. If the power-off location registration, though uncertain, is performed correctly, it is possible to prevent a mobile switching center from unnecessarily paging the mobile station.

Power-on location registration is performed when the user turns on the power switch of the mobile station. For power-on location registration, the mobile station maintains and manages a power-on/initialization timer and does not attempt connection for the purpose of location registration while the timer is activated. Furthermore, in order to prevent the occurrence of continuous location registrations due to repetitive turning on/off of the power switch of the mobile station for a short time, the location registration procedure starts after a lapse of, for example, 20 seconds.

For location registration, the mobile station determines an adjacent cell to be registered and sends a registration message including location registration information to a base station for the determined adjacent cell over an access channel. This registration message is an actual location registration message, wherein the location registration information includes a location registration type, a slot period index, a mobile station protocol update number, a mobile station class indicator, and an incoming call indicator. Upon receipt of the registration message, the base station sends information about the system and network, and a system parameter message including location registration, handoff (or handover) and power control parameters to the mobile station over a paging channel.

The mobile station performs a PN (Pseudo Noise) code sync operation to search for an adjacent cell, prior to performing the power-on location registration subsequent to turning on the power switch. The PN code sync operation includes two steps; a sync acquisition step and a sync tracking step. In the sync acquisition step, a received PN signal and a locally generated PN signal are adjusted to fall within the range of one chip or less. Further, in the sync tracking step, the above two PN signals are finely adjusted so that phases of the PN signals are matched to each other.

FIG. 3 is a flowchart which illustrates a conventional PN code search procedure in a mobile station. A description will now be provided for the conventional PN code search method with reference to FIGS. 1 and 3.

A mobile station determines, in step 310, whether a power-off request is received from a user. Upon detection of the power-off request, the mobile station performs a power-off location registration in step 312. After completion of the power-off location registration, the mobile station determines, in step 314, whether a power-on request is received from the user. Upon detection of the power-on request, the mobile station searches a cell group where the mobile station is presently located, using a received spread spectrum signal in step 316. After the cell group search, at step 318, the mobile station sequentially searches PN codes for adjacent respective cells in a predetermined order. Upon acquisition of PN code sync for a specific cell in the cell search process, the mobile station performs power-on location registration to register itself at the sync-acquired cell, in step 320.

Now, with reference to FIG. 1, a detailed description will be made as to how the mobile station searches the PN codes for the respective cells. It is assumed herein that the mobile station is synchronized with a cell group to which it presently belongs.

When the mobile station is powered on at a location B of FIG. 1 after being power off at a location A, the mobile station initially searches a PN code ($PN_{KA}$) for the cell where it was powered off, that is, cell "A". After the initial PN code search, the mobile station searches the PN codes in predetermined order of, for example, $PN_{KB}$, $PN_{KC}$, $PN_{KD}$, $PN_{KE}$, $PN_{KF}$ and $PN_{KG}$. In the PN code search process, the mobile station compares unique PN codes for the respective cells with PN codes included in a sync frame received from the base station, to search for a PN code having the highest receiving power level. That is, detection of a PN code having the highest receiving power means that the mobile station has detected a cell (or base station) from which it will receive a service.

In other words, upon detection of the power-on request, the mobile station first searches a cell group and then sequentially searches the PN codes for the respective cells in the cell group in the predetermined order.

In such a PN code search method, when the user travels to a cell which is last on the list of cells to be searched according to the predetermined order, a call setup time will increase. For example, when the mobile station travels to a cell using the PN code $PN_{KG}$, the mobile station unnecessarily searches the PN codes $PN_{KB}$, $PN_{KC}$, $PN_{KD}$, $PN_{KE}$ and $PN_{KF}$, thereby wasting search time on the inapplicable PN codes. This inevitably increases the call setup time.

SUMMARY OF THE INVENTION

It is, therefore, an object of the present invention to provide a method for rapidly searching a cell using a PN code in a mobile station.

It is another object of the present invention to provide a method for rapidly searching a cell using a PN code in a mobile station utilizing received power levels of adjacent cells, which are measured to perform a handover.

In accordance with one aspect of the present invention, there is provided a cell search method for a mobile communication system. Upon detection of a power-off request, the mobile station stores in a memory PN information of adjacent cells together with receiving power levels of the adjacent cells. Upon power on, it is determined whether the mobile station is presently located in the same cell group where it was located at a power-off time. When the mobile station is located in the same cell group, it sequentially reads the PN information from the memory in order of receiving power level to search the adjacent cells. Before searching adjacent cells, however, the mobile station first searches a cell registered at the power-off time prior to searching the adjacent cells.

In accordance with another aspect of the present invention, there is provided a cell search method for a mobile communication system. The mobile station measures receiving power levels of adjacent cells to perform a handoff during a call, and monitors a power-off request from a user. Upon detection of the power-off request, the mobile station stores in a memory PN information for the adjacent cells together with the measured receiving power levels, prior to cutting off power. Upon detection of a subsequent power-on request from the user, the mobile station provides the requested power, and then determines whether the mobile station is presently located in the same cell group where the mobile station was located at a power-off time. When the mobile station is located in the same cell group, it searches the cell whose location was registered at the power-off time. However, upon failure to search the initial cell, the mobile station sequentially reads the PN information from the memory in order of receiving power level to search the adjacent cells.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings.

Figure 2:
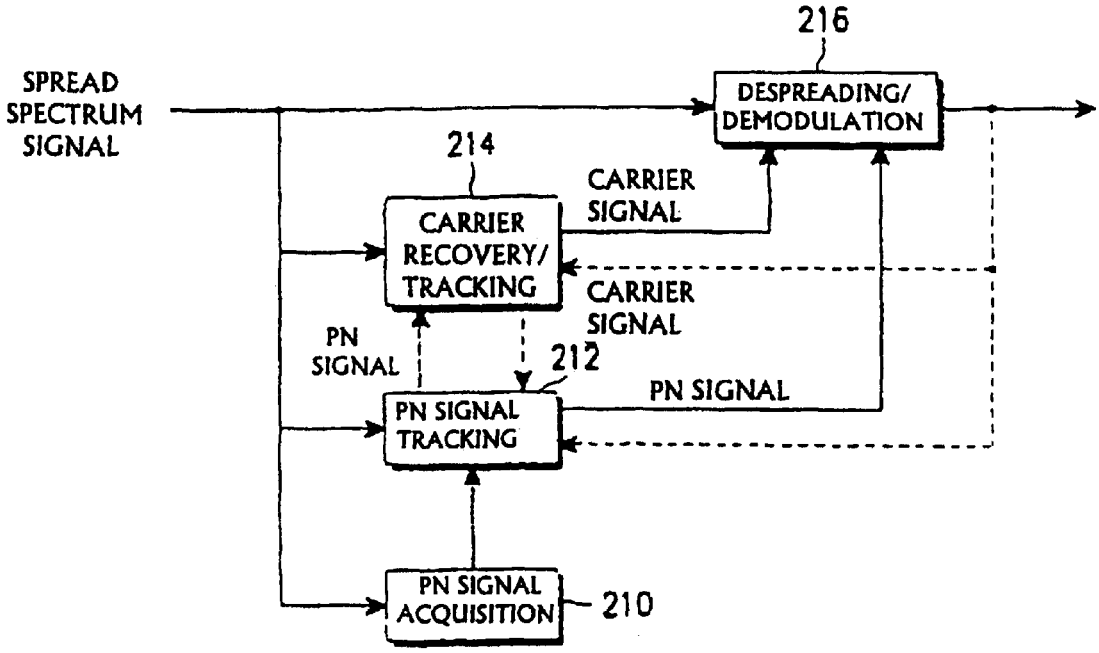
FIG. 2 is a block diagram illustrating a conventional receiver configuration for a mobile station, which searches PN codes.
Figure 3:
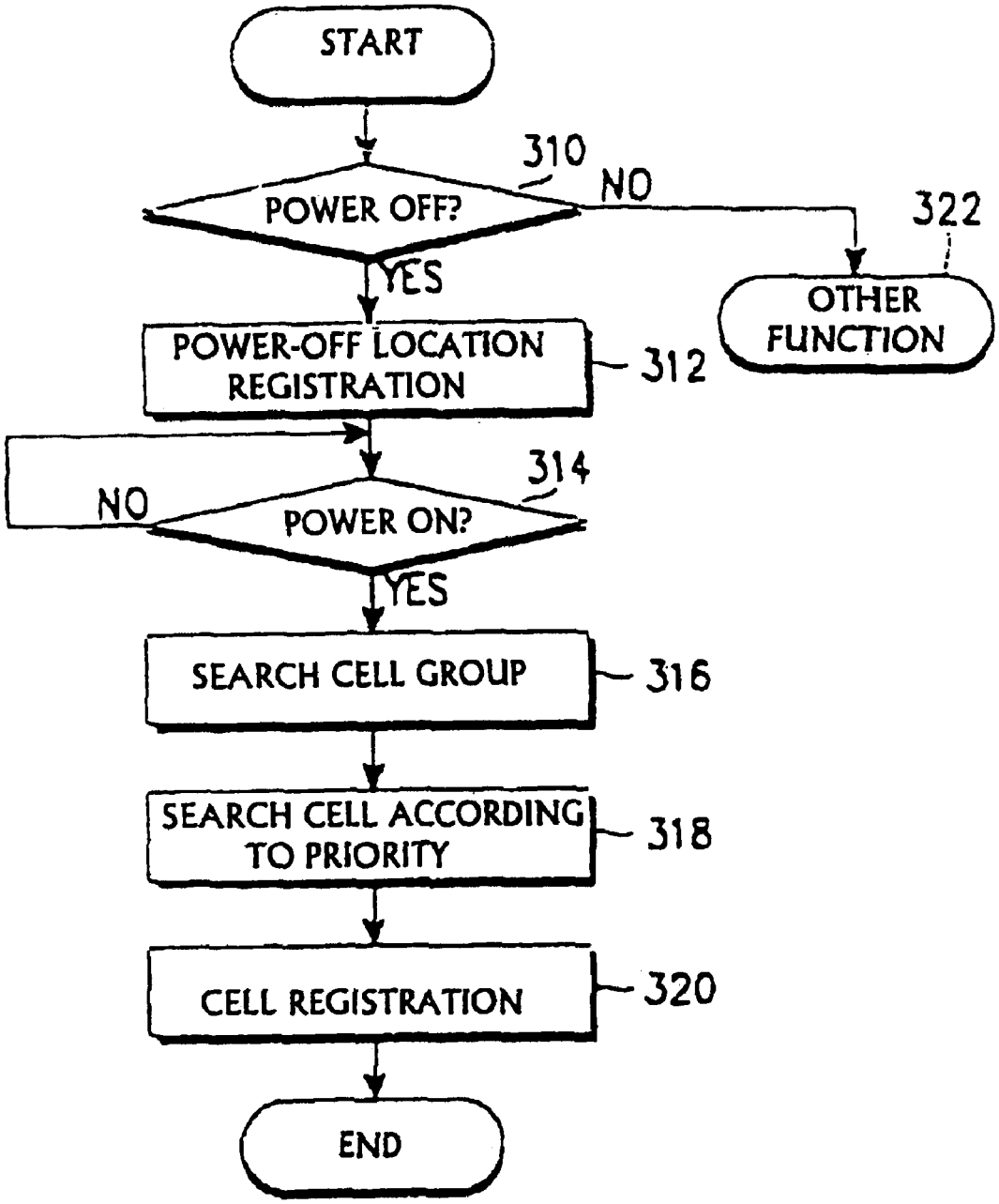
FIG. 3 (PRIOR ART)
FIG. 3 is a flow chart illustrating a procedure for searching PN codes in a mobile station for a conventional mobile communication system.

In general, a receiver in a mobile station includes a PN sync acquisition block, a PN sync tracking block, a carrier recovery/tracking block and a spreading/demodulation block, as illustrated in FIG. 2.

Referring to FIG. 2, a PN signal acquisition part 210 searches phases of received spread spectrum signals to determine a value having the highest correlation with a received PN signal. A PN signal tracing part 212 synchronizes a phase of the determined value with a phase of a PN signal for the received spread spectrum signal, using a feedback loop. A carrier recovery/tracking part 214 extracts a carrier from the received spread spectrum signal. A despreading/demodulation part 216 performs a demodulation/despreading operation using the carrier output from the carrier recovery/tracking part 214 and the PN signal output from the PN signal tracking part 212, so as to obtain a data estimation value from the spread spectrum signal. The carrier and the PN signal output from the carrier recovery/tracking part 214 and the PN signal tracking part 212 are used to assist mutual functions as represented by dotted lines. This is called "decision-directed carrier recovery and synchronization". Further, though not illustrated in FIG. 2, a bandpass filter taking the carrier as a center frequency is generally provided at a preceding stage of the receiver to bandpass filter the spread spectrum signal so as to remove noises and disturbance signals. Furthermore, though not illustrated in the drawing, the embodiment includes a memory for storing PN information in association with power levels of the adjacent cells.

Figure 4:
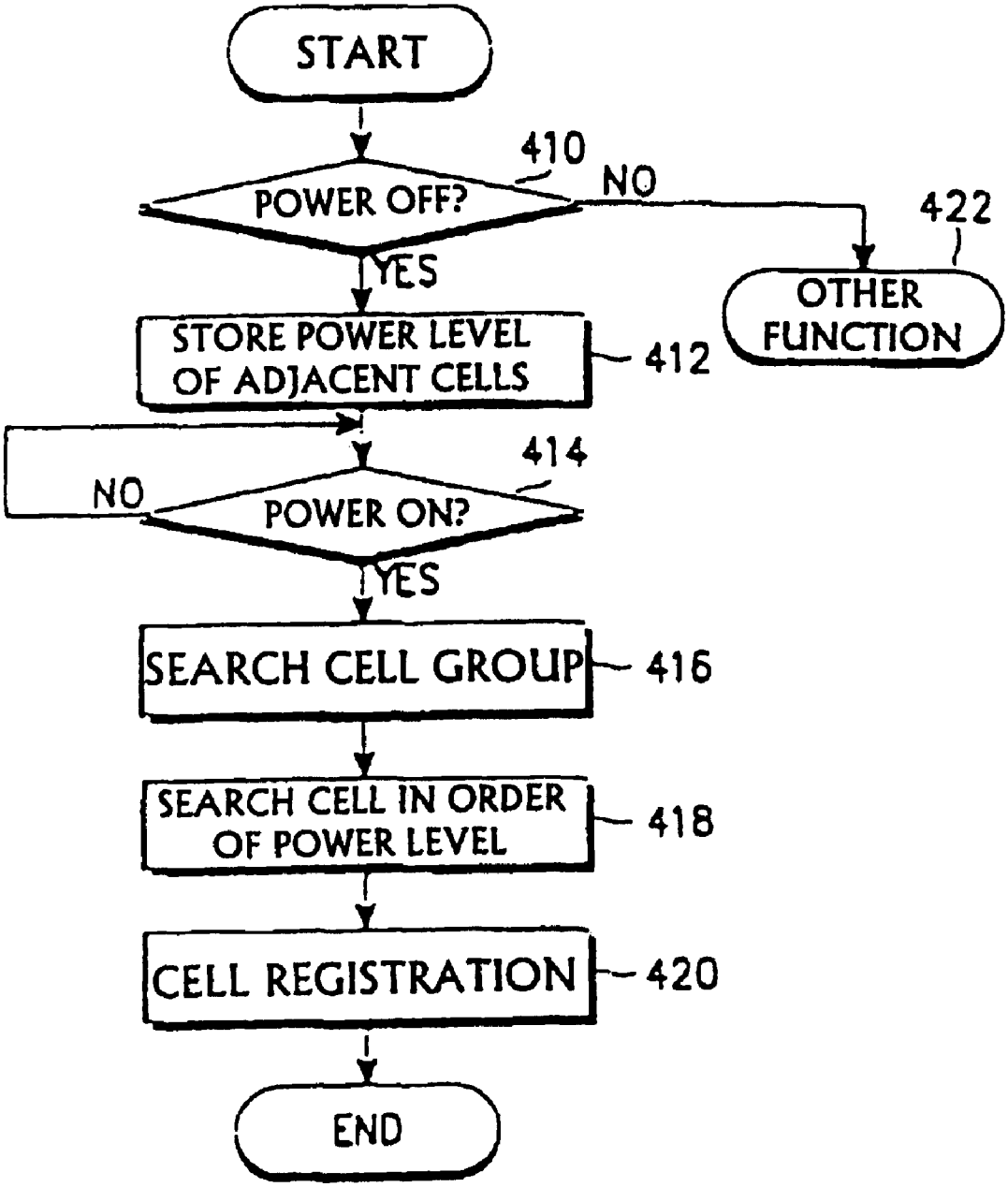
FIG. 4 is a flow chart illustrating a procedure for searching PN codes in a mobile station for a mobile communication system according to an embodiment of the present invention.

In an exemplary embodiment, a receiver as configured in FIG. 2 performs a PN code search operation in accordance with a procedure of FIG. 4. In brief, the procedure of FIG. 4 includes a first step of measuring receiving power levels of respective adjacent cells upon detection of a power-off request and storing the measured power level values. The procedure further includes a second step of searching a cell group upon receipt of a subsequent power-on request and sequentially searching the respective adjacent cells in the order of the stored power values, when the searched cell group corresponds to the power level-measured cell group.

Now, a detailed description will be made regarding a preferred embodiment of the present invention with reference to FIGS. 2 and 4.

A mobile station determines, in step 410, whether a power-off request is received from a user. Here, the user can make the power-off request by operating a power switch. Upon detection of the power-off request, the mobile station measures receiving power levels of adjacent base stations (i.e., adjacent cells) by performing a power-off location registration, and stores the measured power level values in a memory table of an internal flash memory by assigning priorities according to the measured power level values. Once stored, the power supply is then cut off, in step 412. The mobile station also stores, in the memory table, PN information for designating the cell group associated with the measured power levels.

Figure 1:
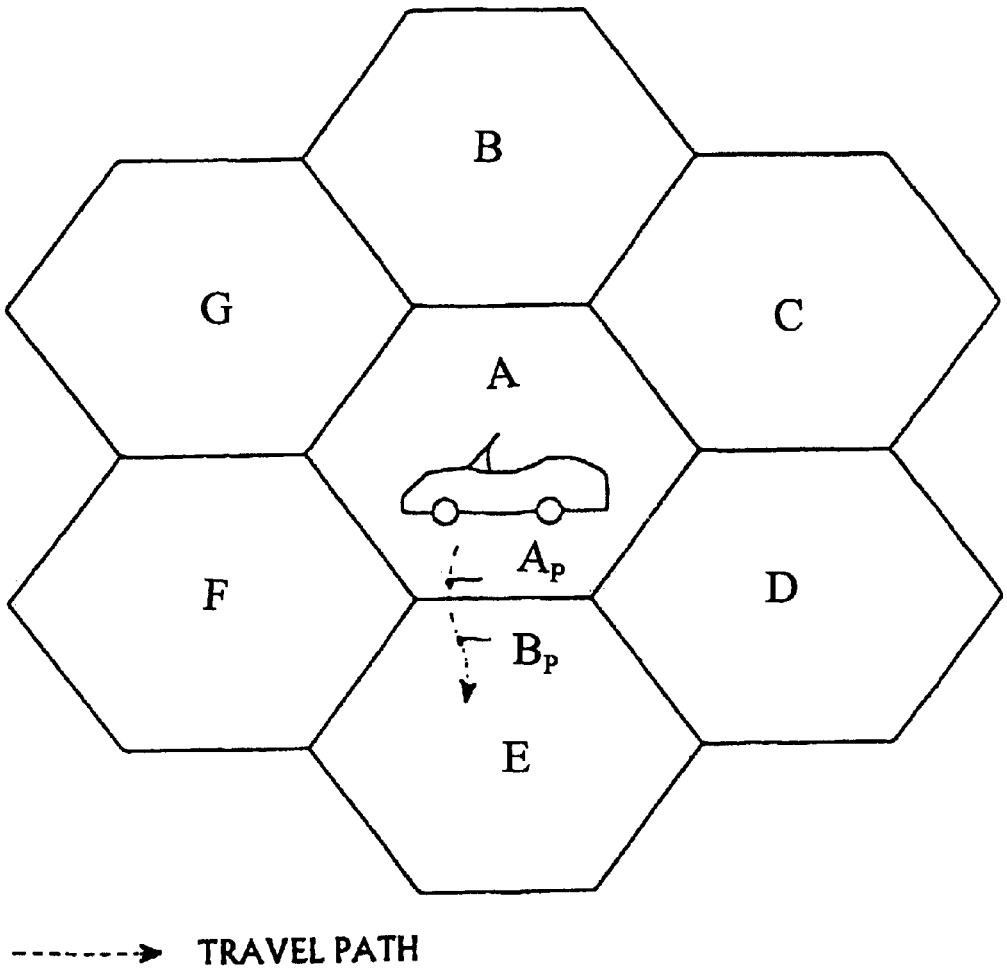
FIG. 1 (PRIOR ART)
FIG. 1 is a diagram illustrating an ideal cellular configuration as utilized in a conventional mobile communication system.

Table 1 shows a memory table formed in the internal flash memory, in which the measured receiving power values are stored with reference to the ideal cellular configuration of FIG. 1.

TABLE 1

| | Priority | *Cell* [PN] [Information] | RX Power |
|---|---|---|---|
| [Cell Group] | 1 | *A* [$PN_{KA}$] | $P_{KA}$ |
| [Index] | 2 | *E* [$PN_{KE}$] | $P_{KE}$ |
| [($PN_{group}$)] | 3 | *C* [$PN_{KC}$] | $P_{KC}$ |
| | 4 | *D* [$PN_{KD}$] | $P_{KD}$ |
| | 5 | *G* [$PN_{KG}$] | $P_{KG}$ |

TABLE 1-continued

| Priority | *Cell* [PN] [Information] | RX Power |
|---|---|---|
| 6 | *F* [$PN_{KF}$] | $P_{KF}$ |
| 7 | *B* [$PN_{KB}$] | $P_{KB}$ |

Although a description has been made with reference to a case where the mobile station measures receiving power of the respective adjacent cells upon detection of a power-off request from the user (Steps 410 and 412), it is also possible to determine data to be stored in the memory table using receiving power levels measured for the purpose of performing a handoff. Commonly, a mobile station periodically monitors receiving power levels of adjacent cells to perform a handoff between base stations during a call.

If the power is off during the handoff, the mobile station can not provide the call service. In this state, the power consumption is minimized. In the minimum power consumption state, even though the mobile station does not provide the call service, it still consumes minimum operation power. Likewise, for the operations of the present invention, a minimum power is required even though the power is off.

In the power-off state, the mobile station determines, in step 414, whether a power-on request is received from the user. Here, the user can make the power-on request by operating the power switch on a keypad of the mobile station. Upon detection of the power-on request, the mobile station searches a cell group in step 416, and determines whether the searched cell group is identical to the cell group stored in the memory table in steps 410 and 412. The cell group stored in the memory table means the cell group where the mobile station was located at the power-off time. Therefore, when it is determined in step 416 that the searched cell group is identical to the stored cell group, it means that the mobile station has remained in the same cell group from the point in time from the power-off time to the power-on time. Otherwise, when the searched cell group is not identical to the stored cell group, it means that the mobile station has moved from the registered cell group after power-off.

Though not illustrated in FIG. 4, when it is determined, in step 416, that the searched cell group is not identical to the stored cell group, the mobile station performs an existing PN code search operation. However, when it is determined, in step 416, that the searched cell group is identical to the stored cell group, the procedure continues at step 418 where the mobile station searches PN codes according to the priorities stored in the memory table in association with the respective cells in the cell group. For the case of the memory table of FIG. 1, the PN codes are searched in the order of $PN_{KA}$, $PN_{KE}$, $PN_{KC}$, $PN_{KD}$, $PN_{KG}$, $PN_{KF}$ and $PN_{KB}$.

The search operation performed in steps 416 and 418 is the same as the operation described with reference to FIG. 2. Further, the search operation is well known in the art. Therefore, a detailed description will be avoided herein.

Upon acquiring synchronization of a PN code for a base station through the PN code search in steps 416 and 418, the mobile station performs a power-on location registration to a base station (i.e. cell) corresponding to the sync-acquired PN code, in step 420. In other words, the mobile station has acquired cell sync for a specific base station.

Next, a novel PN code search procedure will be described with reference to a case where a mobile station is powered off at a location [A] $A_P$ and is powered on at a location [B] $B_P$ during a travel from [a $PN_{KA}$] *an A* cell to [a $PN_{KE}$] *an E* cell, as illustrated in FIG. 1. Herein, it will be assumed that the mobile station has the memory table of Table 1 for the case of power-off at the location [A] $B_P$.

In FIG. 1, the mobile station is registered at a base station servicing the [$PN_{KA}$] *A* cell. The receiving power of the [$PN_{KE}$] *E* cell increases as the mobile station travels to the [$PN_{KE}$] *E* cell which uses the PN code $PN_{KE}$. The mobile station can detect an increase in the receiving power level through measurement of the receiving power level for the handoff. A power-off request occurs when the user turns off the power switch at the location [A] $A_P$. When this occurs the mobile station performs a power-off location registration and cuts off the power supply required for the call. In the meantime, the mobile station stores the cell group and the receiving power levels of the adjacent cells in the cell group at the power-off time in the memory table illustrated by Table 1. The receiving power levels can be stored in the memory table using either the receiving power levels measured to perform the handoff or the receiving power levels measured to perform the power-off location registration. It can be noted from Table 1 that the receiving power levels measured at the location [A] $A_P$ are in the order of [$PN_{KA}$, $PN_{KE}$, $PN_{KC}$, $PN_{KD}$, $PN_{KG}$, $PN_{KF}$ and $PN_{KB}$] *cell A, E, C, D, G, F and B*. For example, even if a receiving power level of the [$PN_{KE}$] *E* cell is higher than a receiving power level of the [$PN_{KA}$] *A* cell, the higher priority will be assigned to the [$PN_{KA}$] *A* cell since the [$PN_{KA}$] *A* cell is the last registered cell.

Meanwhile, when the user subsequently turns on the power switch to make a power-on request at the location B, the mobile station performs the PN code search. Upon power on, the mobile station compares a PN code for a spread spectrum signal received at a power-on time with one of the PN codes stored in the memory table to determine whether they are identical. When the two PN codes are found to be identical, the mobile station searches the PN codes for the adjacent base stations in the order of $PN_{KA}$, $PN_{KE}$, $PN_{KC}$, $PN_{KD}$, $PN_{KG}$, $PN_{KF}$ and $PN_{KB}$ according to receiving power levels stored in the memory table of Table 1.

As described above, upon power on, the novel mobile station performs the PN code search beginning with a PN code for a cell having a highest probability, where the mobile station may be located. In this manner, it is possible to reduce the PN code search time of the mobile station, thereby guaranteeing a fast call setup.

In sum, the novel mobile station measures receiving power levels of the respective adjacent cells at a power-off time, and upon power on, performs the PN sync operation according to the measured receiving power levels, providing the following advantages of:

(1) reducing the PN sync time, thereby providing a fast call service; and (2) reducing a call setup time, thereby decreasing the call charge.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

[1. A method for searching cells in a mobile communication system, comprising the steps of:

upon detection of a power-off request, storing in a memory for a plurality of adjacent cells PN (Pseudo Noise) information and a receiving power level;

upon power on, determining whether the mobile station is presently located in a same cell group where the mobile station was located at a power-off time; and sequentially reading the PN information from the memory in order of receiving power level to search the adjacent cells, when the mobile station is located in the same cell group.]

[2. The method as claimed in claim 1, further comprising the step of searching a cell registered at the power-off time prior to searching the adjacent cells.]

3. A method for searching cells in a mobile communication system, comprising the steps of:

detecting a power-off request from a user;

upon detection of the power-off request, measuring receiving power levels of adjacent cells by performing power-off location registration;

storing in a memory [PN information for the adjacent cells and an] associated measured receiving power [level,] *levels for a plurality of adjacent cells* and cutting off power;

upon detection of a power-on request from a user, providing the power;

determining whether the mobile station is presently located in a same cell group where the mobile station was located at a power-off time;

searching an initial cell whose location was registered at the power-off time, when the mobile station is located in the same cell group; and upon failure to search the initial cell, searching the adjacent cells by sequentially [reading the PN information from the memory] *searching PN codes of the adjacent cells* in order of receiving power level.

4. A method for searching cells in a mobile communication system, comprising the steps of:

measuring receiving power levels of adjacent cells to perform a handoff during a call;

detecting a power-off request from a user;

upon detection of a power-off request, storing in a memory [PN information for the adjacent cells and an] associated measured receiving power levels *for a plurality of adjacent cells*, and cutting off power;

upon detection of a power-on request from the user, providing the power;

determining whether the mobile station is presently located in a same cell group where the mobile station was located at a power-off time;

searching an initial cell whose location was registered at the power-off time, when the mobile station is located in the same cell group; and upon failure to search the initial cell, searching the adjacent cells by sequentially [reading the PN information from the memory] *searching PN codes of the adjacent cells* in order of receiving power level.

*5. A method for searching cells in a mobile communication system, comprising the steps of:*

*(a) upon detection of a power-off request, storing in a memory receiving power levels of a plurality of adjacent cells;*

*(b) upon power on, determining if the mobile station is presently located in a same cell group where the mobile station was located at a power-off time; and*

*(c) sequentially searching PN codes of the adjacent cells in order of the receiving power level, when the mobile station is located in the same cell group.*

*6. The method as claimed in claim 5, further comprising the step of searching a cell registered at the power-off time prior to searching the adjacent cells.*

*7. The method as claimed in claim 5, further comprising the steps of:*

*measuring said receiving power levels by performing power-off location registration;*

*searching for an initial cell whose location was registered at the power-off time; and*

*performing step (c) upon failure to find the initial cell.*

*8. The method as claimed in claim 5, further comprising the steps of:*

*measuring said receiving power levels during handoff;*

*searching for an initial cell whose location was registered at the power-off time; and*

*performing step (c) upon failure to find the initial cell.*

* * * * *